United States Patent Office 3,422,840
Patented Jan. 21, 1969

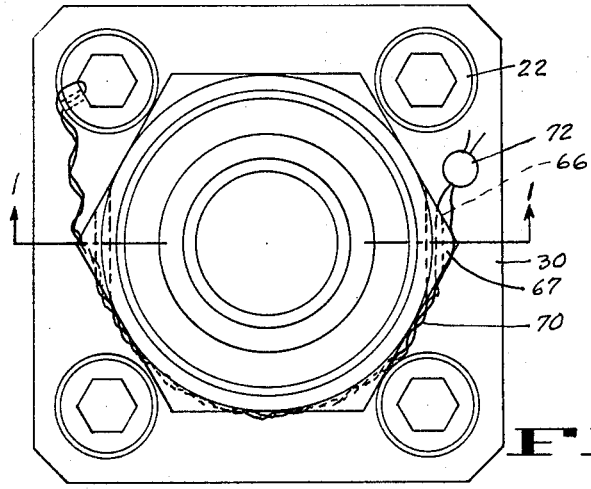
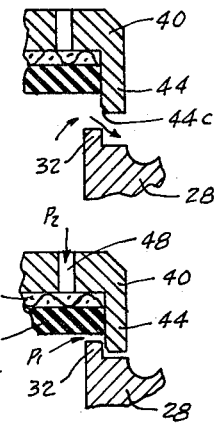
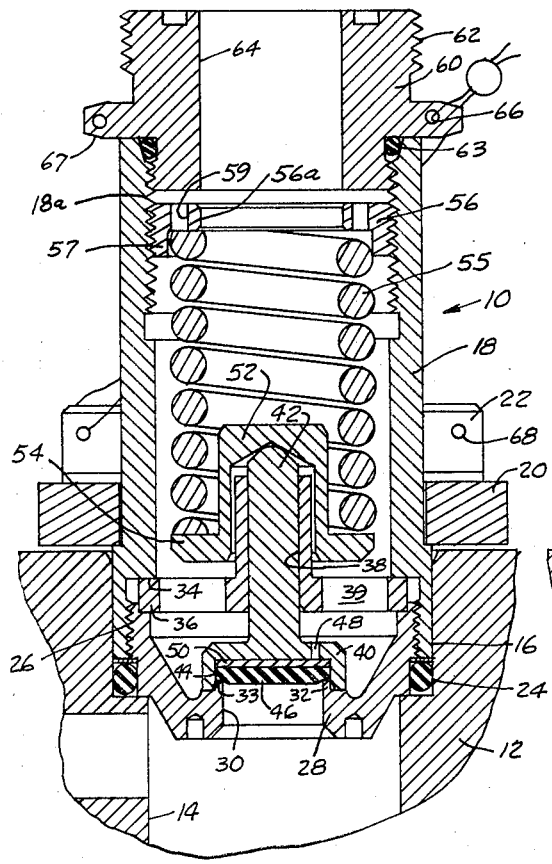
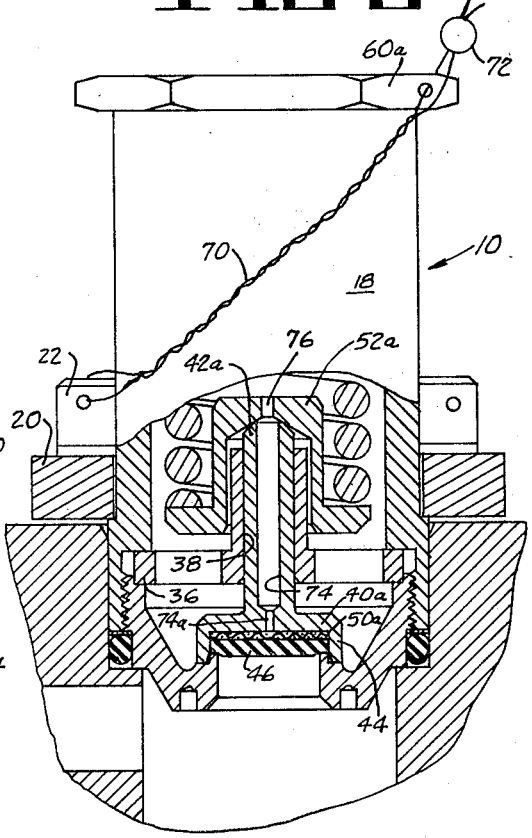
FIG-1  FIG-3
INVENTOR.
AUSTIN U. BRYANT
RICHARD S. BRUMM
BY Gregg & Stidham
ATTORNEYS

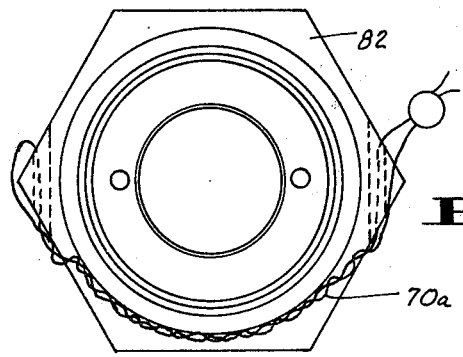
FIG-5-
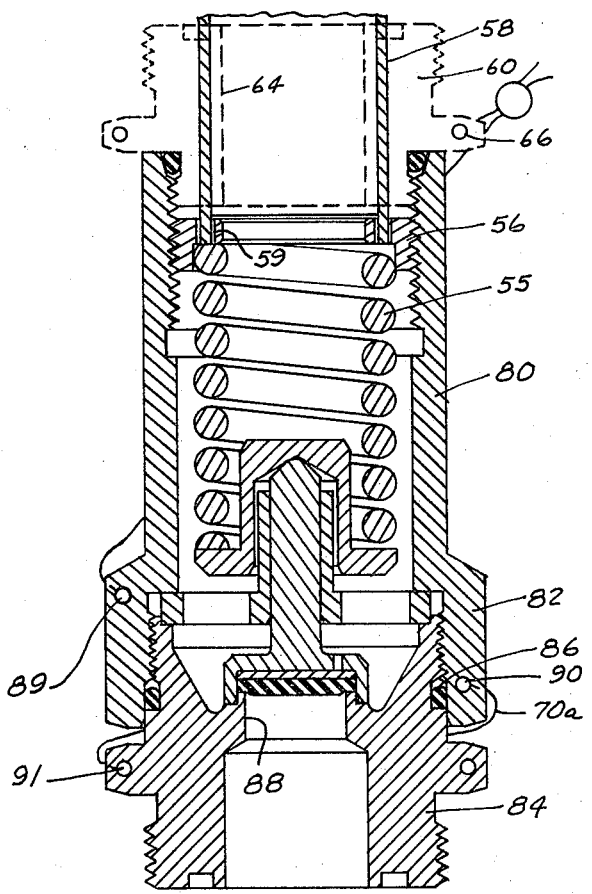
FIG-4-
INVENTOR.
AUSTIN U. BRYANT
BY RICHARD S. BRUMM
Gregg & Stidham
ATTORNEYS

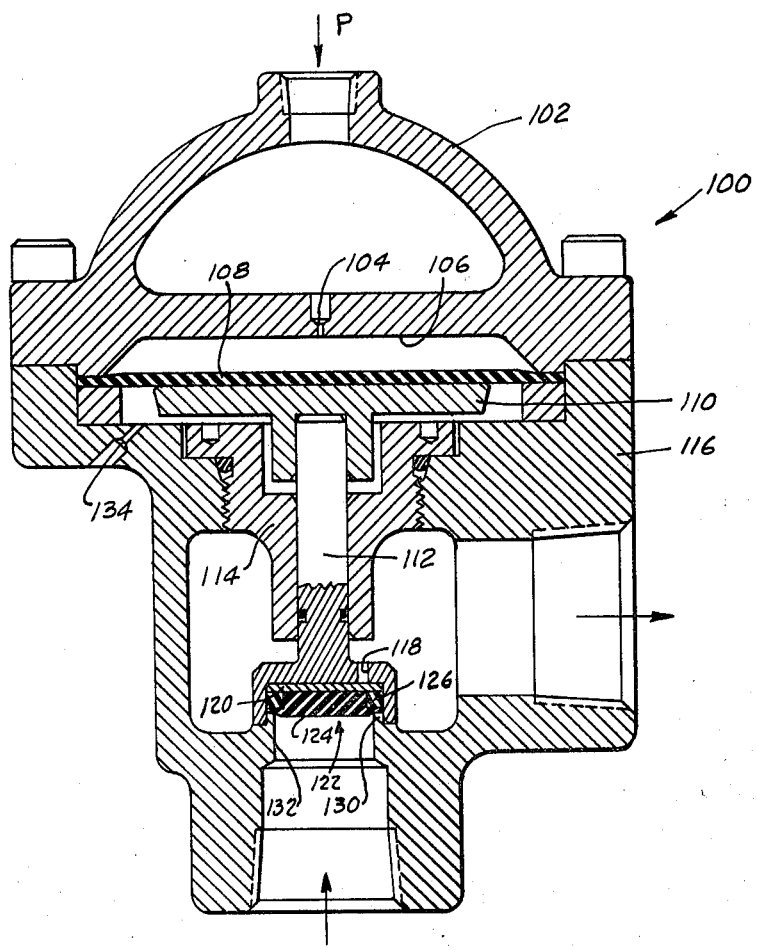

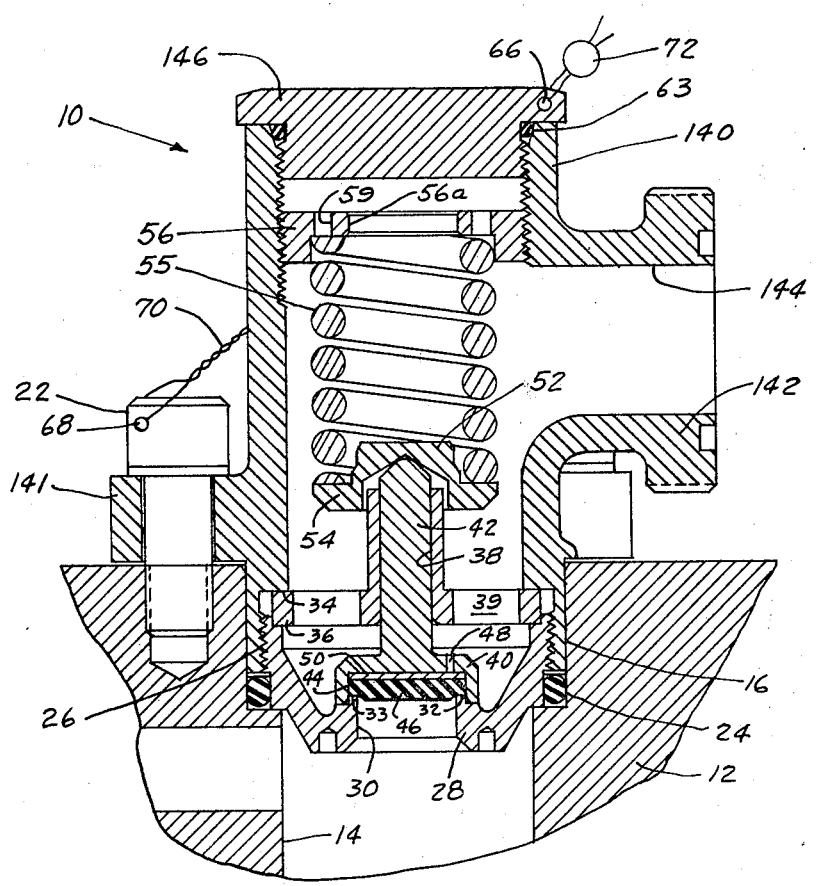
FIG-9-

3,422,840
RELIEF VALVE WITH RESILIENT SEAL MEANS
Austin U. Bryant, Walnut Creek, and Richard S. Brumm, El Cerrito, Calif., assignors to Grove Valve and Regulator Company, Oakland, Calif., a corporation of California
Filed Jan. 17, 1966, Ser. No. 521,203
U.S. Cl. 137—384                                6 Claims
Int. Cl. F16k 35/00, 17/20

ABSTRACT OF THE DISCLOSURE

A relief valve including a valve member formed by a cylindrical receptacle in which is carried a circular resilient seal which engages the cylindrical wall of the receptacle completely around its periphery. The valve seat comprises a cylindrical axial extension and the inner wall of the receptacle slidably engages over the valve seat when in closed position. As the valve is opened, the narrow clearance between the seat and the valve member provides an orifice which results in pressure build-up to facilitate opening of the relief valve and as the resilient seal is lifted from the seat an additional area is exposed to upstream pressure to aid valve opening. A small vent aperture is provided through the bottom wall of the valve member receptacle and a porous distributing disc is interposed between the inner wall of the receptacle and the valve member so that the entire area of the resilient seal is exposed to downstream pressure on the backside for seal retention.

---

This invention relates to a valve construction and, more particularly, to a relief valve having simple and compact tamper-proof pressure adjusting means and a resilient valve seal that is retained by pressure differential between the upstream and downstream sides.

Adjustable relief valves are well-known in fluid transmission systems. In many installations it is highly desirable that means for adjusting the relief pressure be inactivated so that the setting can not be altered inadvertently or by untrained personnel.

It is, therefore, an object of this invention to provide a relief valve that is simple and economical to manufacture and which is convenient and easy to set for adjustment of relieving pressure, but only by authorized personnel.

Fluid tight seals can be effected more readily with resilient sealing means than with metal-to-metal seals, but the retention of resilient seals often presents problems and particularly in relief valves. Since relief valves are commonly open to the atmosphere for direct relief of excessive pressures, the pressure differential across the seal is in excess of the desired system pressure. Consequently, resilient seals are subjected to forces tending to pull them from the recess, particularly under the sudden surge of pressure when the valve seal is initially broken. Use of small vent ducts from the seal accommodating recess to the downstream side, i.e. to the atmosphere, has proven effective in some high pressure installations. However, extremely small holes are very difficult to drill, and small drills are easily broken. Hence, the provision of ducts adequate to achieve proper venting within feasible manufacturing procedures may require holes behind the resilient seal of a size through which a portion of the seal may be extruded. Such extrusion could damage the seal and, in addition, the extruded material may close off the vent and render it ineffective to function as intended.

It is, therefore, an object of this invention to provide a resilient seal member with venting means that exposes the inner surface of the seal recess to downstream pressure over the entire area thereof without requiring vent openings large enough to cause rubber extrusion.

In carrying out this invention, we provide a generally cylindrical valve body to one end of which is secured an annular valve seat assembly forming a coaxial inlet passageway. A valve member is movable within the valve body and is guided along the axis thereof into and out of engagement with the valve seat, a spring being provided ot urge it into sealing engagement. A spring adjustment member is threaded within the valve body and engages the opposite end of the spring to adjust the spring compression force, and, hence, the pressure at which the valve can be opened. A fitting which is also normally threaded into the downstream end of the body prevents access to the spring adjustment member, so that it is only by removal of the fitting that the spring adjustment can be effected. Preferably, this fitting is normally secured against removal by unthreading, in order to prevent tampering or accidental adjustment changes.

The movable valve member has a lower cup-like receptacle that embraces the valve seat when the valve member is in closed position and a circular resilient seal member is carried within the receptacle to engage and seal against the valve seat. Interposed between the inner circular surface of the receptacle and the resilient seal is a porous pressure distributing disc through which gas can flow, but which is so finely porous that portions of the seal cannot be extruded through it. The porous distributing disc exposes the full area of the resilient seal to the lower downstream pressure which is communicated to it through a vent duct. Thus, the distributing disc provides uniform pressure differential over the seal and prevents entrapped pockets of pressure fluid.

Conventionally, relief valves have a movable valve closure member which is exposed to pressure in the vessel or line under control, and the closure member is normally held in closed position by some yieldable member that is overcome when the controlled pressure reaches a predetermined excessive level. Compression springs are commonly used as the biasing means, and for relatively high pressures and/or relatively large orifice sizes springs of considerable force are required. In order to keep the size of the spring and hence the valve housing to a minimum, it is desirable to select as high a spring rate as possible. However, a problem arises in that the force of such springs increases materially with deflection. Consequently, the spring force is radically increased as it is compressed during valve opening movement, and the pressure necessary to move the valve to full flow position may be excessive unless this characteristic of the spring is counteracted.

Characteristically, the effective area of a conventional pop relief valve decreases as the valve opens, and many supplemental means have been provided to increase the effective area of the valve as it opens and compresses the opposing spring. That is, relief valves are commonly provided with a "blowdown" feature which, by providing some means for increasing the effective area of the valve plug or for augmenting the force of pressure acting against such plug, causes it to open suddenly to give immediate, substantial flow. Such valves usually remain open until the pressure has fallen well below opening pressure, at which time they snap shut in order to achieve a tight seal, particularly with metal-to-metal seals. However, this delay of "blowdown" effect has certain disadvantages, particularly in that it is desirable to maintain the operating pressure range, i.e., the difference between opening and closing pressures, as narrow as possible. Moreover, the rapid, full opening of the valve with a sudden release of gas produces a shock effect on personnel who may happen to be nearby. A further disadvantage is encountered in pipeline use where the true pressure level is depressed by friction when the relief valve is open and the gas is flowing out, but is quickly increased when the valve is closed and friction is not a factor, thus causing a "motor boat" effect.

It is, therefore, an object of this invention to provide a compact relief valve with a stiff spring but having means for compensating for the build-up of spring force during compression.

It is a further object of this invention to provide a compact spring-biased relief valve which will commence opening at a set pressure level and move gradually and smoothly to and from full open position and return to seal at the desired pressure level.

It is a further object of this invention to provide a spring-biased relief valve which opens when a predetermined pressure is reached and which closes in firm sealing position at approximately the same pressure level.

In carrying out these objectives, the cup-like receptacle on the movable valve member has a depending skirt with an internal cylindrical surface which, when the valve is closed, engages a complementary external cylindrical surface around the upstanding valve seat. Consequently, during initial movement of the valve the resilient seal moves out of engagement while the cylindrical surfaces are still engaged and flow begins through the annular orifice between them. This orifice results in a pressure build-up behind it so that increased pressure is exerted against the entire area of the resilient seal. Consequently, there is no reduction in effective area as in conventional relief valves of this type and, in fact, there may be a slight increase in effective area opposed by the pressure fluid. Then, as the valve moves further, the flow of fluid around the valve seat, turned inward by the depending skirt, produces a turning effect giving a reactive force very much the same as in a turbine bucket, again increasing the force to compensate for further compression. Finally, this turning effect is further augmented by the high pressure fluid impinging upon the lower surface of the skirt portion so that the higher pressure is now acted on the full area of the valve element.

Conventional spring adjustment means includes a male screw member of relatively small diameter that threadedly engages through a female member on the housing and urges a plate or disc against the top of the spring. Consequently, the housing must be tall enough to accommodate the screw when fully extended plus the female threaded member, all above the spring. In addition, the adjusting screw will extend through and above the housing by an amount necessary to accomplish the full range of adjustment. Finally, it is commonly desirable to cover the adjusting screw with a cap or the like in order to prevent unauthorized personnel from changing the adjustment. Thus, the complete adjustment means for a conventional relief valve requires a housing of considerable size.

It is, therefore, a further object of this invention to provide a relief valve with an extremely compact adjusting means.

This objective is achieved by providing a generally cylindrical spring barrel which is internally threaded to receive a pressure plate with external complementary threads. The threads may be formed on a depending annular portion that embraces the upper end of the spring so that the internal threads in the housing actually surround the spring rather than being placed above it. In addition, the same internal threads may be used to receive the protective cap which prevents access to the integral adjusting screw and pressure plate.

Other objects and advantages of this invention will become apparent from the description following when read in conjunction with the accompanying drawings wherein:

FIG. 1 is a section view of one embodiment of this invention taken along line 1—1 of FIG. 2;

FIG. 2 is a top view of the relief valve of FIG. 1;

FIG. 3 is a view partially in section of another embodiment of this invention;

FIG. 4 is a vertical section view of another embodiment of this invention showing means of spring adjustment;

FIG. 5 is a top view of the relief valve of FIG. 4;

FIGS. 6 and 7 are enlarged partial section views showing the relief valve in various stages of operation; and FIGS. 8 and 9 are section views of still further embodiments of this invention.

Referring now to FIG. 1, the relief valve 10 of this invention is designed for operation in a fluid transmission system which may, for example, include a manifold housing 12 with the flow passageways 14 bored therein. A counterbore 16 provides a recess for receipt of the cylindrical valve body 18 which may be clamped against the main housing 12 by means of a retainer plate 20 secured by capscrews 22, with an O-ring 24 being provided to prevent leakage around the housing.

The cylindrical housing 18 is internally threaded at the upstream end 26 to receive an annular valve seat assembly 28 including a central inlet passage 30 which is surrounded by an annular, axial extension 32, the upper surface of which forms the valve seat 33. Clamped between the valve seat assembly 28 and an internal shoulder 34 is a valve guide 36 having a central guide sleeve 38 and a plurality of surrounding flow passages 39. The valve member 40 has a cylindrical slide extension 42 which is slidably received within the sleeve 38. At the lower end of the valve member 40 a cup-like receptacle 44 carries a circular resilient valve seal 46. A vent passage 48 large enough to be drilled conveniently, is bored through the valve member 40 to bring the inner surface of the seal receptacle 44 into communication with the downstream side of the valve, and interposed between the receptacle inner surface and the resilient seal 46 is a pressure distributing member 50 formed of porous material such as sintered metal or of porous structure, such as wire mesh 50a (FIG. 3). The pressure distributing member is sufficiently porous that the gas in the system can flow through it to expose the entire inner surface of the resilient seal to the downstream (atmospheric) pressure while the outer surface is exposed throughout to the upstream pressure.

The upper end of the valve member guide extension 42 is rotatably received within a force transmitting cup 52 having a lower radial flange 54 against which a strong compression spring 55 acts. The upper end of the spring 55 is engaged by an annular spring adjustment member 56 which is threaded into the upper end of the cylindrical valve body 18 so that when threaded down, the spring force is increased. The combined pressure ring and adjustment screw has a depending portion 57 which extends down around the spring, and the internal threads 18a actually surround the spring. The annular member 56 with central fluid passage opening 56a may be engaged by a span wrench 58 (FIG. 4) in accommodating holes 59 in the upper surface so that the initial force of the spring may be adjusted to the level desired for opening the valve when system pressure exceeds the level desired. Also engaging the same threads 18a in the upper end of the housing is an annular fitting 60 which may have an upper threaded extension 62 for coupling to an exhaust line (not shown), and, if desired, the fitting may be sealed as by means of an O-ring 63. As shown best in FIG. 4, the central opening or exhaust passage 64 in the annular fitting 60 is approximately the same diameter as that (56a) of the spring adjustment ring 56. Hence, when the fitting 60 is in place as shown in phantom, the span wrench 58 cannot be inserted into the holes 59 in the upper surface of the spring adjustment ring 56. Consequently, removal of the exhaust fitting 60 is a necessary prerequisite to spring adjustment.

As will be noted in FIGS. 1, 2, and 3, small holes 66 are bored through the fitting 60 across one or more angles of the hexagonal wrench accommodating portion 67, and other holes 68 are bored through at least some of the capscrews 22 which mount the relief valve 10 on the main housing. The spring 55 may be adjusted to the desired level at the factory or at the installation. In either event, when the valve is installed, with the fitting 50 threaded onto the downstream end of the cylindrical valve body, a wire 70 is strung through the small holes 66 and 68 with the ends being drawn together and joined by suitable means such as a standard lead seal 72 crimped onto the wire. As will be noted particularly in FIGS. 2 and 3, the wire 70 passes around the valve housing 18 from the capscrews to the fitting 60 or 60a in a counter-clockwise direction so that the counter-clockwise rotation of the fitting 60 or 60a through more than just a few degrees is prevented. With conventional right-hand threads, this is the direction of rotation that would be required to loosen and remove the fitting and, hence, removal of the fitting is impossible without breaking the wire 70 or severing the lead seal 72. Of course, if left-hand threads were provided, the wire would be directed around the valve body in the opposite direction.

Since the spring can be adjusted only by removal of the fitting 60 or 60a for direct access to the upper surface of the spring adjustment ring 56, the wire 70 will prevent adjustment by the unwary and, if broken, will serve as a warning of tampering.

Referring specifically to FIG. 3, the embodiment of this invention there shown includes a downstream vent passageway 74 which is centrally disposed through the valve guide stem 42a terminating in an orifice 74a opening into the seal receptacle 44. In this embodiment, a wire mesh 50a is interposed between the inner surface of the receptacle 44 and the resilient seal 46 to prevent entrapment of gas and insure distribution of downstream pressure throughout the back surface of the resilient seal 46. Preferably, a communicating vent 76 is provided in the force transmitting member 52a. Also shown in FIG. 3 is a different type of exhaust fitting 60a which may be employed where the relief valve is located in an area where the exhausting gases are not objectionable and no outlet line coupling is required.

A still further embodiment is shown in FIG. 4 wherein the valve body 80 is threaded at the upstream end where it is enlarged at 82 to receive a coupling 84 adapting it for connection in a standard conduit joint. An O-ring 86 is provided to seal around the coupling which is bored at 88 to provide the inlet flow passage. As in the other embodiments, holes 66 are provided in the outlet fitting 60 for receipt of the safety wire 70, with a hole 89 being provided in the enlarged portion 82 for the other end of the wire. In addition, in this embodiment similar holes 90 and 91 are also provided in the upstream end of the housing 80 and in the fitting 84, respectively so that this joint likewise cannot be broken without severing a second lock wire 70a. As shown in FIG. 5, the wire 70a also extends from the upstream end 82 to the upstream fitting 84 in a counterclockwise direction to prevent inadvertent uncoupling of that joint.

Because the relief valve is biased closed by a fairly strong spring sufficient to overcome upstream pressure up to that considered excessive, there will always be a substantial pressure differential from the outer surface of the seal to the inner surface of the seal recess. That is, as a relief valve it will not open until desired working pressures are exceeded and, with just atmospheric pressures on the downstream side, the pressure differential across the seal is considerable.

Preferably, the spring 55 has a high spring rate and, hence, is more compact and can be loaded with little axial deflection. However, in a typical relief valve of this general type, compression of the spring during valve opening increases its force substantially, often in excess of 30%, and it is, therefore, desirable to augment the force asserted by the opposing fluid so that the pressure required to open the valve to full flow position is within tolerable limits. This is accomplished by provision of a relationship between the movable valve member and the valve seat whereby upstream pressure has a gradually increasing effect as the valve opens.

As seen in FIGS. 1 and 3, the skirt portion 44 of the valve member seats against the valve seat ring assembly 28 in order to limit compression of the resilient seal 46 when the valve is in closed position. Then, as seen in FIG. 6, the initial movement of the valve member 40 releases compression on the resilient seal 46 and the skirt 44 on the valve member separates from the valve seat assembly ring. At this time, the small clearance between the complementary cylindrical surface on the annular extensions 44 and 32 form an orifice between them through which initial flow surges at high velocity and, hence, low pressure. Pressure $P_1$ builds up behind this orifice, and, since it is located opposite the outer edge of the resilient seal, the entire area of the resilient seal is exposed to the higher upstream pressure in opposition to the spring 55. This also fosters seal retention. In addition, the depending axial extension 44 deflects the initial fluid flow downward as shown by the arrows, and the turning effect creates a reactive force similar to that of a turbine bucket, further to augment spring opposing forces. Then, as the valve member 40 moves further to the position shown in FIG. 7, the chamfered edge 44a of the extension provides increased flow and, in addition, the pressure fluid impinges upon first a wedging surface and then the horizontal surface of the skirt 44 when the valve member is completely separated from the seat. Thus, the upstream pressure acts against a greater area to increase the total force opposing the spring or, stated conversely, to reduce the amount of pressure necessary to oppose the compressed spring. While the increase in force because of the turning effect augmented by the increased area is sufficient to counteract the increase in spring force, it is not excessive and, as pressure reduces, this force will reduce gradually back through the "turbine bucket" and "annular orifice" stages for a smooth closing to a fluid-tight resilient seal.

When the pressure is reduced to a level below that necessary to oppose the spring, the valve will close in the position shown in FIG. 1 wherein the skirt 44 is in metal-to-metal contact with the valve seat assembly 28 and the resilient seal 46 is under limited compression for a fluid-tight seal.

Referring now to FIG. 8, there is shown another embodiment of this invention wherein the relief valve 100 is airloaded. There, a pressure dome 102 is loaded by introduction of a pressure fluid P which passes through a dampening orifice 104 into a diaphragm chamber 106 which acts against a resilient diaphragm 108 carrying a valve actuating plate 110 on the opposite side from which there depends a valve stem 112 which is slidably guided in a slide bearing 114 threaded into the valve body 116. As in the other embodiments, a vent hole 118 introduces downstream pressure to a porous distributing disc 120 so that the downstream pressure will be exerted against the inner face of the seal member 122. The seal member in this embodiment comprises a main seal disc 124 of Teflon or other suitable inert material with a ring of rubber or the like 126 being provided around the Teflon ring for greater resilience on the sealing circumference where the ring engages with the valve seat 130.

Preferably, the main diaphragm is of a predetermined area relative to the effective area of the seal 124 in sealing position, i.e. the area against which upstream pressure acts, so that the setting of the loading pressure P will automatically determine the level of the opening pressure. For example, the diaphragm may be made precisely ten times the effective area of the seal so that a loading pressure of 150 p.s.i. will inherently result in an opening pressure of 1,500 p.s.i. The bottom surface of the diaphragm 108 is acted upon by atmospheric pressure with an orifice 134 preferably being provided to dampen fluctuations of the diaphragm.

In FIG. 9 we show a side venting relief valve body 140 with lateral protrusions 141 through which capscrews 22 secure it to a fluid system housing 12. The valve body has a hub 142 which, with relieving flow passage 144, extends laterally so that vertical space requirements for the valve and connecting piping are lessened. In this embodiment, the spring adjustment screw 56 does not require a central opening 56a, but it is desirable to employ as many of the FIG. 1 embodiment components as possible. Flow through the top of the valve body is prevented by a cap 146 sealed at 63. Again, a lock wire 70 with a lead seal 72 prevents unauthorized removal of the cap.

While we have described this invention in conjunction with preferred embodiments thereof, it is obvious that further modifications and changes therein may be made by those skilled in the art without departing from the spirit and scope of this invention as defined by the claims appended hereto.

Having described our invention, we claim:

1. In a valve construction comprising a housing having an inlet flow passageway, an annular valve seat surrounding said inlet flow passageway, a valve member on the downstream side of said valve seat movable axially into and out of closed position in engagement with said valve seat, the improvement comprising:
   a cylindrical seal receptacle on said valve member,
   a circular sealing member of resilient material carried in said receptacle for sealing engagement with said valve seat,
   said sealing member engaging the cylindrical inner surface of said receptacle around the periphery thereof,
   a first annular axial extension on said housing around said inlet flow passageway forming said valve seat,
   the cylindrical wall of said valve member receptacle extending axially beyond said sealing member,
   means forming a vent passageway in said valve member through the circular inner wall of said receptacle to the downstream side of said valve member, and
   the inner cylindrical surface on said valve member receptacle slidably engaging said first annular extension to provide a restricted flow passage therebetween.

2. In the valve construction of claim 1:
   a porous pressure distributing disc interposed between said sealing member and said inner surface of the receptacle.

3. The valve construction of claim 1 wherein said housing comprises:
   a cylindrical portion extending downstream from said valve seat, and including:
   a spring biasing said valve member toward said valve seat,
   an annular spring adjustment ring adjustable movable along said cylindrical portion,
   means on the downstream annular face of said ring engageable for producing adjustable movement thereof, and
   an annular fitting secured on the downstream end of said cylindrical portion,
   the adjustment producing means on said ring being located outside an axial projection of the central opening in said fitting.

4. The valve construction of claim 1 including:
   an annular member carrying said valve seat secured in the upstream end of said housing,
   said second axial extension engaging said annular member when said valve member is in closed position to limit compression of said sealing member.

5. The valve construction of claim 1 including:
   stop means on said housing around said first axial extension engageable by axial extension of the cylindrical wall on said valve member when said sealing member is compressed thereby 6. In a valve construction comprising a housing having an inlet flow passageway, an annular valve seat surrounding said inlet flow passageway, a valve member on the downstream side of said valve seat movable axially into and out of closed position in engagement with said valve seat, the improvement comprising:
   a cylindrical seal receptacle on said valve member,
   a circular sealing member of resilient material carried in said receptacle for sealing engagement with said valve seat,
   said sealing member engaging the cylindrical inner surface of said receptacle around the periphery thereof.
   means forming a vent passageway in said valve member through the circular inner wall of said receptacle to the downstream side of said valve member, and
   a porous pressure distributing disc interposed between said sealing member and said inner surface of said receptacle.

References Cited

UNITED STATES PATENTS

| | | | |
|---|---|---|---|
| 1,229,885 | 6/1917 | Chadwick | 137—540 XR |
| 1,772,107 | 10/1930 | Nelson | 137—469 XR |
| 2,254,209 | 9/1941 | Buttner | 137—540 |
| 2,279,002 | 4/1942 | MacNeil | 137—540 |
| 2,320,339 | 6/1943 | Buttner | 137—540 XR |
| 2,641,871 | 6/1953 | Ray | 137—505.29 |
| 2,695,032 | 11/1954 | Kmiecik | 137—469 |
| 3,025,874 | 3/1962 | Yocum | 137—540 |
| 3,074,425 | 1/1963 | Kikendall | 137—477 |

FOREIGN PATENTS

| | | |
|---|---|---|
| 465,178 | 5/1937 | Great Britain. |
| 706,112 | 3/1954 | Great Britain. |

HAROLD W. WEAKLEY, *Primary Examiner.*

U.S. Cl. X.R.

137—469, 515.5, 540